J. P. Farnum. Sheet 2. 5 Sheets.
Book Cutting.
Nº 9,503. Patented Dec. 28, 1852.

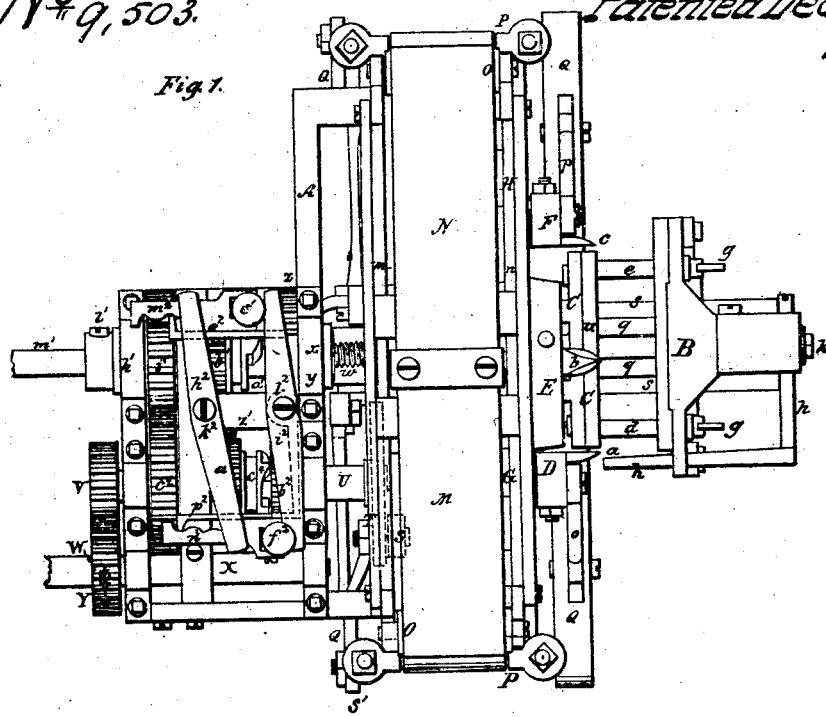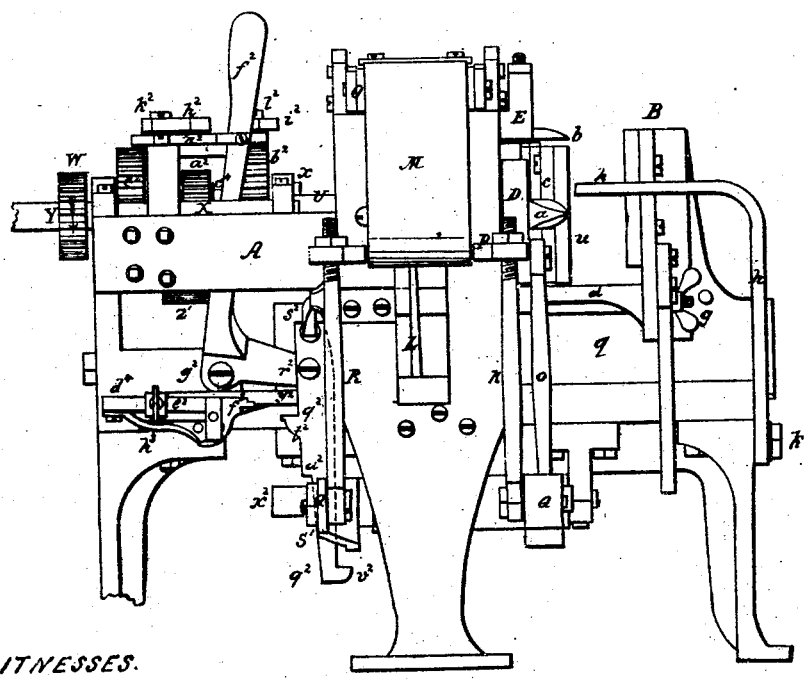

WITNESSES
J. Jenkins
C. B. Clark

INVENTOR
J. P. Farnum

J. P. Farnum.
Book Cutting.

Nº 9,503. Patented Dec. Dec. 28, 1852.

Sheet 3. 5 Sheets.

WITNESSES
J. Jenkins
L. B. Clark

INVENTOR
J. P. Farnum

J. P. Farnum.
Book Cutting.
N° 9,503. Patented Dec. 28, 1852.

WITNESSES
J. Jenkins
C. B. Clark

INVENTOR
J. P. Farnum

J. P. Farnum.
Book Cutting.
Nº 9,503. Patented Dec. 28, 1852.

WITNESSES
J. Jenkins
C. B. Clark

INVENTOR
J. P. Farnum

UNITED STATES PATENT OFFICE.

JOHN P. FARNUM, OF ANDOVER, MASSACHUSETTS, ASSIGNOR TO HIMSELF, J. JENKINS, AND C. B. CLARK.

CUTTING PAPER.

Specification of Letters Patent No. 9,503, dated December 28, 1852.

*To all whom it may concern:*

Be it known that I, JOHN P. FARNUM, of Andover, in the county of Essex and State of Massachusetts, have invented a new and useful Machine for Trimming the Three Edges of a Book or Mass of Paper at One Operation or Time; and I do hereby declare that the same is fully described and represented in the following specification and the accompanying drawings, letters, figures, and references thereof.

Figure 3:
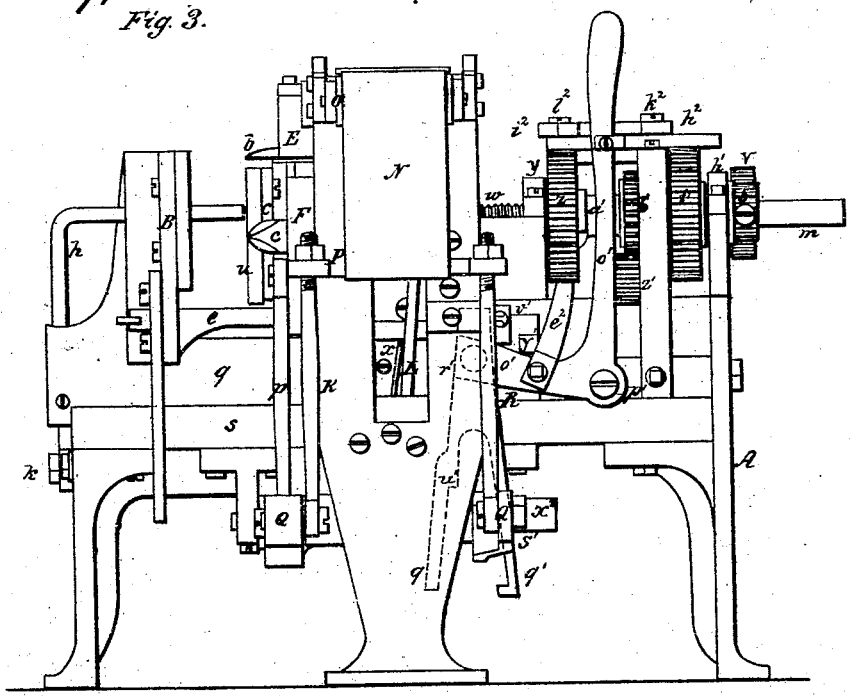
Figure 4:
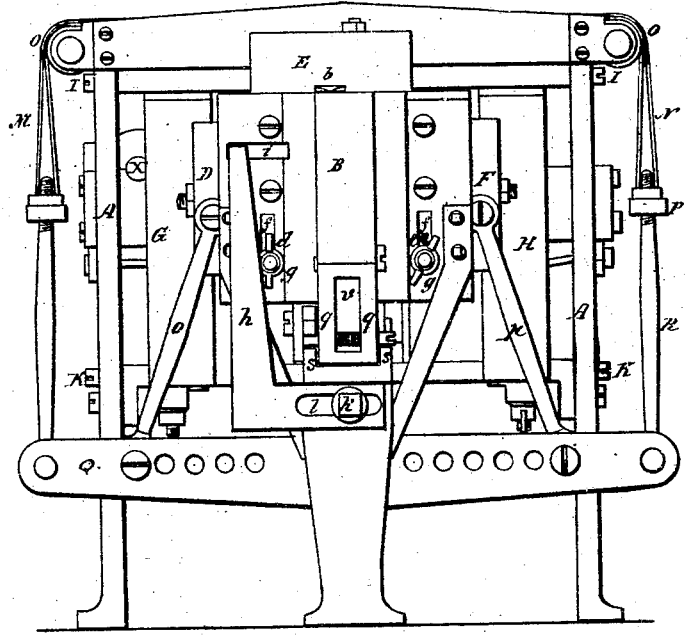
Figure 5:
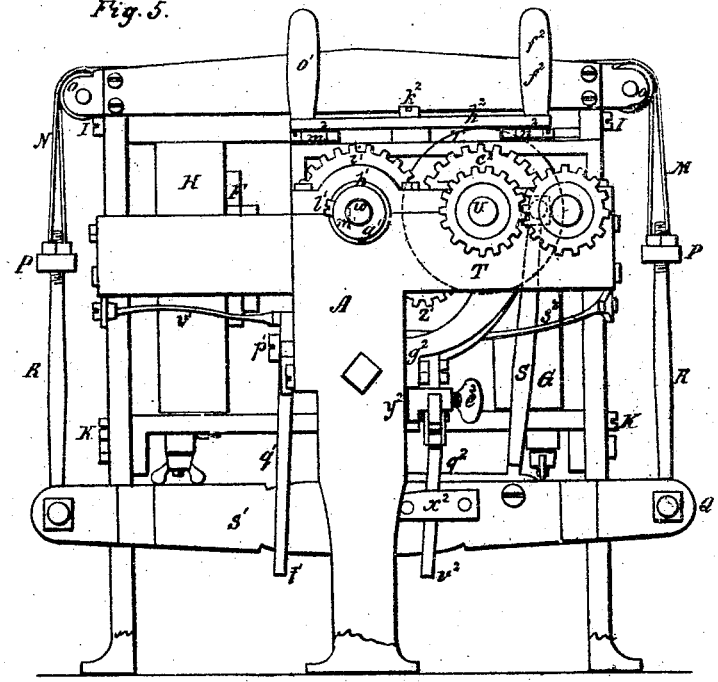
Figure 6:
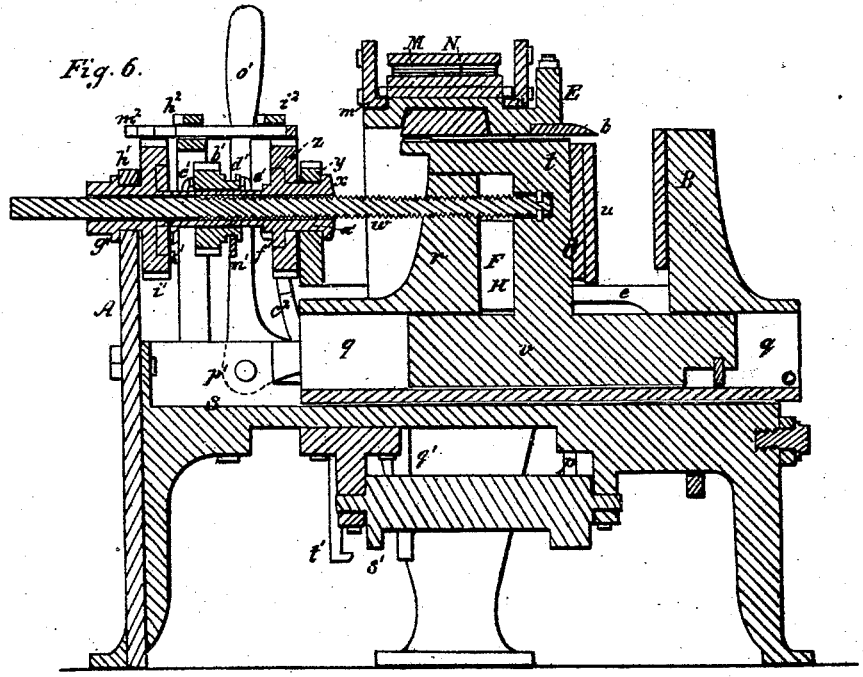

Of the said drawings Figure 1 denotes a top view of my said machine. Fig. 2 is a front elevation of it. Fig. 3 is a rear elevation of it. Fig. 4 is an elevation of one side of it. Fig. 5 is an elevation of the other side of it. Fig. 6 is a central and vertical section of it.

In the said drawings A represents the main frame work by which the operative parts are sustained. It may be constructed as exhibited in the drawings or in any other proper manner.

B is the upright bed of the press in which the book is pressed and held and moved toward the cutting knives. C is the platen of the said press.

$a, b, c$, are three knives or sets of knives, two of which, viz. $a$ and $c$ operate or are made to have reciprocating motions in paths at right angles to that of the reciprocating motion of the upper one $b$. The knives $a, b, c$, are respectively held or sustained by three carriages D, E, F, two of which, viz., D and F, slide up and down in vertical directions, while the third (viz., E) is made to move horizontally, their movements being so arranged as to cause no interference of the carriages with one another; that is to say, while the horizontal carriage E is made to move toward either of the others, the latter is being moved downward, and so when the former is moved away from the latter the last is to be raised upward.

In operating with the machine the book or body of paper to be trimmed on its three edges is placed in a vertical position between the bed and platen of the press, and with what is termed the "back" of it resting on bearers or arms $d, e$, that extend rearward from the face of the bed and are so adapted to the bed as to be capable of being set or adjusted to any desirable height. For this purpose each bearer is made to move in a vertical slot $f$ made through the bed and is confined in position by a set screw and nut as seen at $g$. One of the vertical edges of the book is made to rest against another bearer $h$ that extends through a horizontal slot $i$ (made through the bed) and is fastened to the main frame by a screw $k$ made to pass through a slot $l$, as seen in the drawings. Having placed the book on the two bearers $d, e$, and against the bearer $h$, the platen is next to be moved up or toward the book, so as to firmly compress the latter between it and the bed. This having been accomplished the press carrying the book is moved backward, the knives (in motion) until they meet the book and cut entirely into and through it on its three edges. At the next operation the press is moved in an opposite direction or forward to its original position. Next the platen is moved away from the bed, so as to enable a person to remove the book from the bearers and place another one on the same. During the process of cutting through the mass of paper and the moving of the book in a direction away from the knives the flat sides of the knives perform the operation of polishing the edges of the book preparatory to its being gilded. For this purpose each of the knives is to be made with a polishing inner face or surface to rub against the cut edge of the book and polish or smooth it. Or instead of making the polishers directly on the knives they may be arranged or affixed in the knife frames and by the side of and near to the respective knives, so as to move with them.

Having thus described the operation and principal members of the machine, I shall now proceed to specify the mechanism by which they are actuated.

Figure 7:
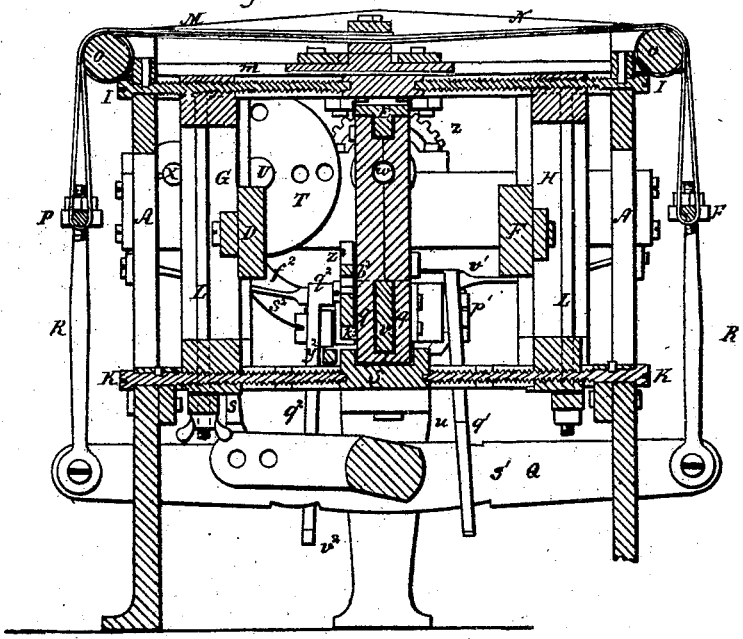
Figure 8:
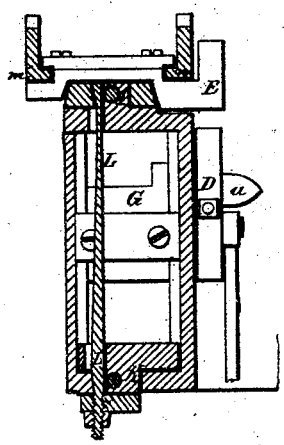

In the first place the upper knife carriage E is supported and slides horizontally on parallel ways or rails $m, n$, arranged as seen in Fig. 6. In the second place the other two knife carriages D, F, are each supported by and made to slide on one of two upright frames G, H, see Figs. 2 and 7, the latter being a vertical and transverse section of the machine, which section is taken through the said frames G, H. These frames G, H, are each provided with adjusting screws I, K, that are to be so applied to them and the main frame as to enable the frames G, H, to be moved toward or away from each other in order to adjust the two sets of vertical knives at their proper distance apart for any size or length of book to be cut. When adjusted they are firmly held in position by wedge clamps L, L, having screws and nuts fixed on the lower ends and made as seen in Figs. 7 and 8, the latter of which is a vertical section of part of the main frame, one of the frames G, H, and the clamp L thereof.

Figure 9:
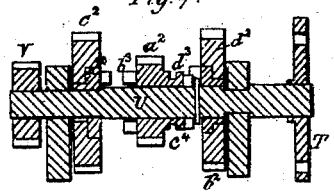

The upper carriage E has belts M N extended each way from it and over guide rollers O, O, and respectively fastened or connected to or looped around rods or bars P, P, that are connected to a rocker frame or lever Q by connecting rods R, R, R, R, as seen in the drawings. This rocker frame or lever is placed under and is sustained by the main frame, so as to rock or turn on a fulcrum or suitable bearings arranged at its middle. It rocks in a vertical plane and is put in motion by means of a connecting rod S which connects it with a crank, or crank plate T situated on a shaft U situated as seen in the drawings and particularly in Fig. 9, which is a vertical and longitudinal section of the said shaft and the parts or mechanism directly applied to or fixed on it. The shaft U has a gear wheel V fixed on its outer end, the said gear being made to engage with another gear W that is fixed on the driving or fly wheel shaft X, that is put in revolution in the direction denoted by the arrow seen at Y. The revolutions of the main shaft produce a reciprocating rocking motion of the rocker frame or lever such as will cause the knife frame E to move to and fro in a horizontal plane. Each side knife frame D, F, is moved at the same time by the rocker lever which is connected with it by a connecting rod $o$ or $p$ properly jointed to both.

Figure 10:
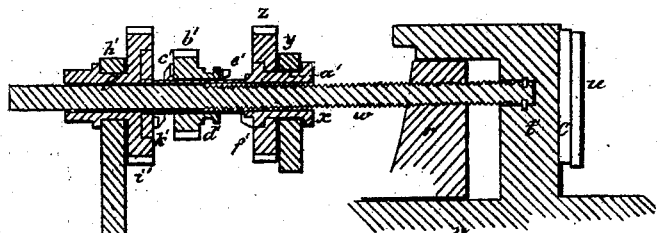
Figures 11, 12:
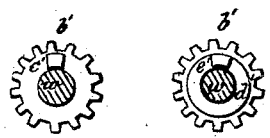
Figure 13:
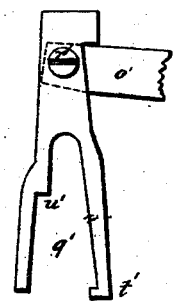

We now come to the description of the mechanism by which the press is operated. The bed B is fixed on and rises perpendicularly from a horizontal slide bar $q$ that is supported and made to move in a grooved bar $s$ that forms part of the main frame. A standard $r$ rises up from and is firmly fixed to the slide bar $q$. Between the standard $r$ and the bed is the platen C and the platen holder $t$, which latter is simply a post of metal to which the platen C is held by a dovetail or any other proper connection by which it can be easily removed from the post, in order to enable a person to apply to it a holding board $u$ of any desirable size. The post $t$ rises up from a horizontal slide or bar $v$ that slides longitudinally within the slide bar $q$. A screw $w$ is screwed through the standard $r$ and has one end so connected with the post $t$ as to be capable of turning in it while it is held to the post in other respects. By revolving the screw the platen will be put in motion either toward or away from the bed according to the direction in which the screw is revolved. On the screw $w$ there is a screw nut $x$, see Figs. 1 and 10, the latter of which is a vertical and longitudinal section of the screw $w$ and the parts directly applied to it. This screw nut revolves in a stationary box $y$ and is so connected to such box as to be only capable of being revolved on its axis. The screw nut has a gear wheel $z$ fixed on a tubular shaft $a'$ extended back from it, the said gear wheel having a catch projection $f'$ applied to its side. On this tubular shaft there is a gear $b'$, that is provided with clutches or projections $c'$ on one side of it and a grooved wheel $d'$ and clutch projections $e'$ on its opposite side, as seen in the drawings, Fig. 11 being a view of one side of the gear $b'$ and its clutch projection, while Fig. 12 is a similar view of the opposite of it. There is a tubular shaft $g'$ which turns in a stationary bearing $h'$ and on the shaft of the screw $w$ and is so applied to the bearing as to be capable of no movement except a rotary one on its axis. It carries a spur gear $i'$ on its inner side which has a clutch projection $k'$ on its side that is next to the gear $b'$. The screw shaft should be so applied to the shaft $g'$ as to be capable of being slid freely in a longitudinal direction through it and also to be revolved by the tubular shaft when the latter is put in revolution. For this latter purpose the tubular shaft has a screw or projection $l'$ that is made to extend from it into a long groove $m'$ cut lengthwise in the screw shaft. A projection $n'$ (see Fig. 15) from a shifting lever $o'$ extends into the groove of the periphery of the wheel $d'$, so that when the said lever is moved on its fulcrum $p'$ it shall move the wheel $d'$ and the gear wheel to which it is affixed. The extremity of the lower arm of the lever $o'$ has a forked lever $q'$ hung to it by means of a screw $r'$. The fork of the lever straddles the back bar $s'$ of the rocker frame Q, and has a hook or shoulder $t'$ made on one leg of the fork, while the other leg is provided with a shoulder $u'$, all as seen in Fig. 13, which is a side view of the forked lever. By means of a spring $v'$ (connected at one end to the upper arm of the forked lever and at the other to the main frame) the forked lever is held in such position when necessary as to prevent the back bar $s'$ from coming in contact with either the shoulder $u'$ or hook $t'$.

Figure 14:
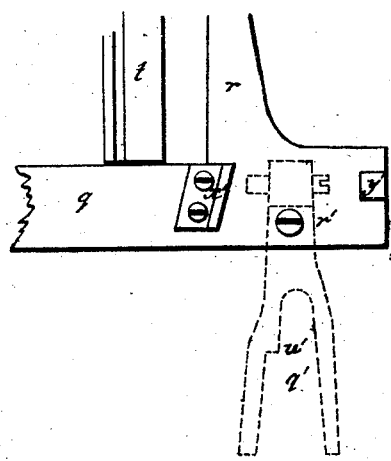

On the side of the slide bar $q$ there are two projections $x'$, $y'$, arranged, as seen in Fig. 14, which is a side view of the bar $q$ and sundry parts appurtenant thereto. The upper arm of the forked lever is bent over so as to stand directly between these two projections $x'$, $y'$. Now just previous to the completion of the movement of the bed and platen away from the knives, after the said knives have been acting against the book, the projection $y'$ will be carried into contact with the upper arm of the forked lever, and will thereby move the said forked lever on its fulcrum so as to carry the shoulder $u'$ directly over the back bar $s'$ of the rocker frame Q. The next time this bar of the rocker frame rises upward it will press against the shoulder $u'$, so as to lift the fork and thereby cause the shifting lever $o'$ to be moved on its fulcrum in such manner as to move the gear $b'$ and clutch it with or to the spur gear $i'$.

Figure 15:
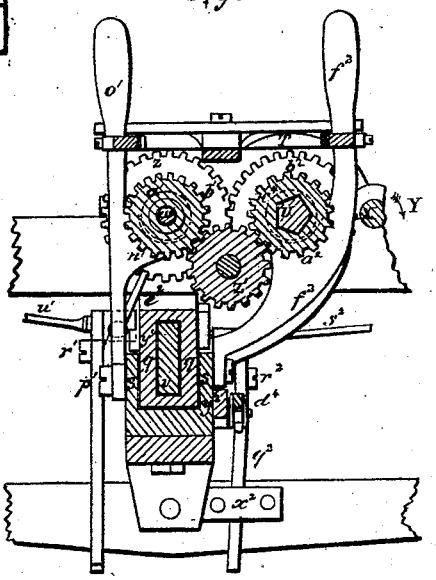

The gear $b'$ engages with and is turned by a connective gear $z'$ that is placed below it and engages with another clutch gear $a^2$, as seen in Fig. 15, which represents a transverse and vertical section of the machine taken through the three gears $b'$, $z'$, and $a^2$. The clutch gear $a^2$ is made and provided with clutch projections $b^3$, $d^3$, and a grooved wheel $c^2$ like those of the clutch wheel $b'$. It is placed and slides freely on the shaft U, which is made polygonal in section where it receives the gear, in order that the rotary movement of the shaft may cause a rotary movement of the gear or clutch wheel $a^2$. The shaft U is provided with two other gears $b^2$, $c^2$, which are situated as seen in the drawings and made to rotate freely on the shaft. One of the gears, viz. $b^2$, engages with the gear $z$, while the other, viz. $c^2$, is made to engage with the gear $i'$. The inner face of each gear $b^2$, $c^2$, or that side of it which is next to the clutch wheel, is provided with one or more clutch projections $d^2$, by which it may be clutched to the gear $a^2$ when the latter is moved up against it.

When the shifting lever $o'$ is actuated by the shoulder $u'$, as above described, a projecting arm $e^2$ from it is caused to enter between the teeth of the gear $z$, and so as to prevent any rotary movement of the said gear and the screw nut $x$ while it (the arm $e^2$) is so between the said teeth. As soon as the gear $b'$ is clutched to the gear $i'$ the latter will be put in revolution and will create a revolution of the screw shaft and the screw $w$, in a direction such as will draw the platen away from the bed and thus relieve the book from pressure between the bed and platen. In regard to the projection $x'$, just at the termination of the operation of moving the book against the knives, so that they shall have cut entirely through it, such projection $x'$ will be moved against the upper arm of the forked lever, so as to move such lever sufficiently to carry the hook projection or shoulder $t'$ directly underneath the back bar $s'$ of the rocker lever Q, so that on the next descent of such bar $s'$ it will strike on the shoulder $t'$ and thereby depress or pull down the forked lever, and so as to turn the shifting lever $o'$ on its fulcrum sufficiently to move the clutch gear $b'$ toward, and clutch it to, the gear $z$ of the screw nut $x$, whereby the said screw nut will be set in revolution in a direction such as will cause it to move the screw and the press forward in a direction away from the cutters.

Another shifting lever is seen at $f^2$, its fulcrum being at $g^2$. It is intended to operate the clutch gear $a^2$ as the lever $o^1$ does the clutch wheel $b'$. Two horizontal levers $h^2$, $i^2$, playing on fulcra $k^2$, $l^2$ are arranged with respect to the upper arms of the two shifting levers $f^2$, $o'$, as seen in the drawings. To each shifting lever there is a catch rack $m^2$ or $n^2$, which operates in connection with a spring catch $o^2$ or $p^2$. A pendulous lever $q^2$ is connected with the short arm of the shifting lever $f^2$ by a screw $r^2$, on which the said lever $q^2$ plays freely. A vertical cross section of the lever $q^2$ and some of the parts or mechanism immediately adjacent thereto is given in Fig. 16. A spring $s^2$ is applied to the upper arm of the lever and fastened to the main frame. It serves to bring the lever into a vertical position after any movement of it. The said lever $q^2$ is formed with two shoulders $w^2$, $v^2$, and a projection $t^2$, as seen in Fig. 17, which is a side view of it and the adjacent parts which operate in connection with it. The lower arm of the lever $q^2$ extends down through an opening $w^2$ made in a projection $x^2$ that is extended from the back bar $s'$ of the frame Q, the same being as seen in Fig. 17. The platen post has a long arm or bar $y^2$ fastened to it and extended downward a short distance and thence backward horizontally and under the lever $f^2$, as seen in the drawings. A metallic slotted plate $z^2$ is jointed to the vertical part of the bar $y^2$, or is made to play or turn vertically on a screw $a^3$ inserted in the bar $y^2$. The form of this plate and its slot $b^3$ is seen in Fig. 17, a screw or pin $c^3$ being passed through the slot and screwed or inserted in the slide bar $q$. During the movements of the platen toward or away from the bed the plate $z^2$ will be moved with and by it; the slot $b^3$ will therefore work or move on the screw $c^3$ and so as to impart a vertical movement to the said plate.

A slide $d^4$ is applied to the rear end of the bar $y^2$ and held in any desirable position by means of a set screw $e^3$. The front end of the slide carries a small tripping lever $f^3$, that is made and formed as seen in the drawings, and particularly in Fig. 18, which is a side view of it. This tripping lever works on a fulcrum at $g^3$, and has a spring $h^3$, made to press downward on its lower bent arm, the said spring being attached to the slide $d^4$. The spring serves to throw the shoulder $i^3$ of the tripping lever close against the front end of the slide.

Figure 16:
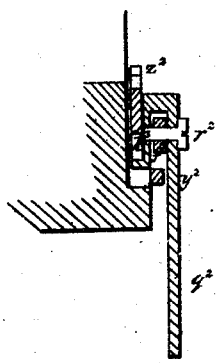
Figures 17, 18:
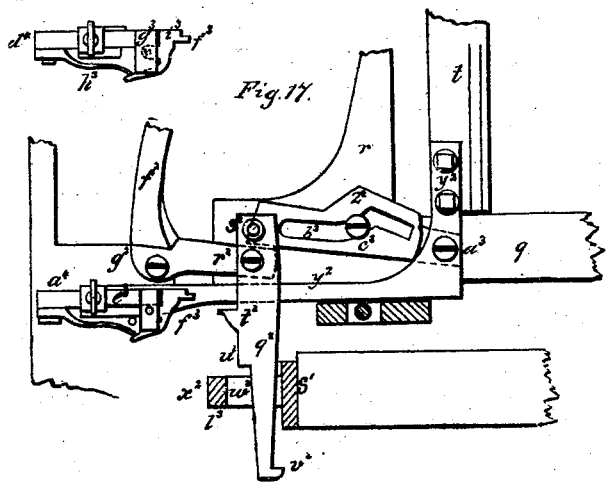

At or about at the completion of the operation of moving the platen away from the bed, the rear end of the slotted plate $z^2$ is moved against the front vertical edge of a stud or projection $k^3$ extended from the lever $q^2$ and below its fulcrum, as seen in Fig. 16. The movement or pressure of the end of the slotted plate against the stud will move the lower arm of the lever $q^2$ backward, so as to carry its shoulder $u^2$ directly into the path of motion of part $l^3$ of the projection $x^2$ of the back bar $s'$ of the rocker frame Q. When the part $l^3$ next rises upward, it will therefore be carried against the shoulder $u^2$, and will lift the lever $q^2$, so as to move the shifting lever $p^2$ on its fulcrum sufficiently to move the clutch gear $a^2$ of the said shifting lever toward the gear wheel $c^2$ and clutch it thereto, and therefore as the clutch gear $a^2$ is in revolution the said gear $c^2$ will be revolved and thus actuate or put in action the mechanism by which the platen is moved toward the bed. During the upward movement of the lever $q^2$ its projection $t^2$ is elevated into a horizontal plane, or the path of motion of the front end of the upper arm of the tripping lever $f^3$. Now while the platen is in movement toward the bed or just before the completion of such forward movement, the front end of the upper arm of the tripping lever will be moved against the projection $t^2$ and so as to press the lower arm of the lever $q^2$ forward, and move the shoulder $v^2$ of the said lever directly into the path of motion of the bar $s'$ of the rocker frame Q. Consequently when the said bar next descends toward the said shoulder it will press it and the lever $q^2$ downward to the extent sufficient to move the shifting lever $f^2$ far enough to slide the clutch gear $a^2$ forward into engagement with the gear $b^2$, and thereby such gear $b^2$, as the gear $a^2$ is in revolution, will be put in revolution and set in motion the machinery by which the platen and bed are simultaneously drawn backward toward the cutters.

The object of the tripping lever $f^3$ may be thus explained: It will be seen that when it rests against the projection $t^2$ of the lever $q^2$, and such lever descends, the latter would be likely to carry the projection $t^2$ below the tripping lever, so as to enable the spring $s^2$ to move the lever $q^2$ so as to carry its shoulder $v^2$ backward out of the path of the bar $s'$; but as the projection $t^2$ and the tripping lever are formed so as to lock or catch upon one another the tripping lever will be turned on its fulcrum during the descent of the projection $t^2$, and continue to keep the lever $q^2$ from being thrown backward by the reaction of the spring $s^2$. When the platen is next moved backward or away from the bed, the tripping lever will be moved backward simultaneously with it and on leaving the projection $t^2$ will fly or be thrown upward (into its former position) by the action of its spring $h^3$, and during the next forward movement of the platen and bed the said tripping lever will pass over or above the projection $t^2$ and not come in contact with it so as to actuate or move the lever $q^2$. It should be remarked, however, that under these circumstances the shifting lever $f^2$ stands in such a position as to keep the clutch gear of it out of engagement with either of the gears $b^2$, $c^2$. The movement of such clutch gear into such position will have been effected at the proper time by the forward movement of the upper arm of the shifting lever $o'$, which arm during such movement presses against one arm of the horizontal lever $i^2$, and moves the lever $i^2$ so as to cause its other arm to press the other shifting lever backward far enough to throw its clutch gear out of engagement with either of the gears on the same shaft with it, and particularly out of engagement with the gear $b^2$, whereby the operation or movement of the machinery which was in action to simultaneously draw backward the platen and bed will be stopped, and this preparatory to a simultaneous forward movement of the platen and bed which next and immediately after takes place. When the upper arm of the shifting lever $f^2$ is moved back so as to carry or force the clutch gear of such lever into engagement with the gear $c^2$, it will move the lever $h^2$ so as to cause it to bear against the shifting lever $o'$ and move it so as to move its clutch gear $b'$ out of engagement with either of the gears on the same shaft with it.

By means of the set screw $e^3$ and the slide $d^4$ applied to the bar $y^2$ the position of the tripping lever $f^3$ may be varied, that is to say, the said tripping lever may be set farther forward or backward as occasion may require in order to cause more or less pressure to be exerted on the book or books between the platen and bed.

Having thus described the elements of the combination invented by me and explained the mechanism I have adopted for putting them in action in the manner as hereinbefore specified, I would remark that I do not intend to confine my invention to the precise form or arrangement of its parts as represented in the drawings, but intend to vary the same to any extent while I do not change the character of the machine.

What I claim is—

1. The combination of a press or its equivalent for holding the book or paper to be cut with one or more cutters or knives for trimming the front or one edge and one or more cutters for trimming one or both of the other edges of the book, the different sets of cutters being simultaneously operated, while the paper or press is moved toward them, all substantially as above specified.

2. And in combination with such cutters or knives for trimming one or the front and other edge or edges of a book at one operation or time, I claim the improvement of combining with them or either of them one or more polishing surfaces as described or their equivalents, whereby the edges of the sheets or paper are cut and polished or smoothed ready for gilding, substantially as specified.

In testimony whereof I have hereto set my signature this twenty-ninth day of June, A. D. 1852.

JOHN P. FARNUM.

Witnesses:
SAMUEL MERRILL,
SAMUEL CARLETON.